US007448670B2

(12) United States Patent
Baker et al.

(10) Patent No.: US 7,448,670 B2
(45) Date of Patent: Nov. 11, 2008

(54) VEHICLE DOOR REINFORCEMENT

(75) Inventors: Ron Baker, North Branch, MI (US);
Michael David Lund, Metamora, MI (US); Garry Kasaczun, Chesterfield, MI (US)

(73) Assignee: Noble Advanced Technologies, Inc., Warren, MI (US)

( * ) Notice: Subject to any disclaimer, the term of this patent is extended or adjusted under 35 U.S.C. 154(b) by 396 days.

(21) Appl. No.: 11/304,275

(22) Filed: Dec. 15, 2005

(65) Prior Publication Data
US 2006/0152035 A1 Jul. 13, 2006

Related U.S. Application Data

(60) Provisional application No. 60/642,681, filed on Jan. 10, 2005.

(51) Int. Cl.
*B60J 5/00* (2006.01)
(52) U.S. Cl. ............... 296/146.6; 296/146.2; 49/502
(58) Field of Classification Search ............ 296/187.12, 296/203.03, 146.1, 146.6, 146.2, 146.3; 49/502
See application file for complete search history.

(56) References Cited

U.S. PATENT DOCUMENTS

| | | | |
|---|---|---|---|
| 4,667,442 A | 5/1987 | Hiramatsu et al. ............ 49/441 |
| 4,743,062 A | 5/1988 | McLaren et al. ............. 296/146 |
| 5,083,832 A | 1/1992 | Ohya ........................ 296/146 |
| 5,542,738 A * | 8/1996 | Walker et al. .......... 296/187.05 |
| 5,707,098 A | 1/1998 | Uchida et al. ............ 296/196.6 |
| 5,762,394 A * | 6/1998 | Salmonowicz et al. ... 296/146.5 |
| 5,906,072 A * | 5/1999 | Feige et al. ................... 49/502 |
| 6,176,542 B1 | 1/2001 | Gooding et al. .......... 296/146.6 |
| 6,205,714 B1 | 3/2001 | Staser et al. .................. 49/502 |
| 6,305,738 B1 | 10/2001 | Gehringhoff et al. ...... 296/146.6 |
| 6,381,906 B1 * | 5/2002 | Pacella et al. ................. 49/502 |
| 6,382,707 B1 | 5/2002 | Dunneback .............. 296/146.6 |
| 6,394,529 B2 * | 5/2002 | Davis et al. ............ 296/146.16 |
| 6,428,080 B1 * | 8/2002 | Ochoa ...................... 296/146.6 |
| 6,450,565 B2 | 9/2002 | Yamamoto .................. 296/188 |
| 6,478,364 B2 | 11/2002 | Gerber ..................... 296/146.5 |
| 6,575,525 B2 | 6/2003 | Traister et al. .............. 296/188 |
| 6,631,940 B2 | 10/2003 | Dauvergne et al. ........ 296/146.6 |
| 6,668,490 B2 | 12/2003 | Hock et al. ................... 49/502 |
| 6,805,397 B1 | 10/2004 | Chernoff et al. ......... 296/146.2 |
| 6,824,198 B2 | 11/2004 | Sakuma et al. ........... 296/146.6 |
| 6,869,130 B2 | 3/2005 | Bodin et al. ............. 296/146.6 |
| 2002/0000077 A1 * | 1/2002 | Goto et al. ................. 52/730.4 |
| 2002/0073627 A1 | 6/2002 | Hock .......................... 49/502 |
| 2003/0205918 A1 * | 11/2003 | Carvalho et al. ....... 296/203.03 |
| 2004/0216387 A1 | 11/2004 | Furuse ........................ 49/502 |

(Continued)

*Primary Examiner*—Jason S Morrow
(74) *Attorney, Agent, or Firm*—Gifford, Krass, Sprinkle, Anderson & Citkowski, P.C.

(57) ABSTRACT

A reinforcement member for reinforcing an outer panel of a vehicle door includes an upper wall, an outer wall, a leg and a reinforcement beam. The leg extends between a lower end of the upper wall and an upper end of the outer wall. The reinforcement beam is formed at a lower end of the outer wall for reinforcing the outer panel of the vehicle door. A generally S-shaped flange is formed between the lower end of the upper wall and the leg. A portion of the S-shaped flange is substantially parallel with the upper wall so as to define a recess adjacent the S-shaped flange that provides enhanced retention of a door seal thereto.

19 Claims, 6 Drawing Sheets

U.S. PATENT DOCUMENTS

| | | | |
|---|---|---|---|
| 2004/0217623 A1 | 11/2004 | Chernoff et al | 296/146.6 |
| 2006/0156632 A1* | 7/2006 | Ruppert et al. | 49/502 |
| 2007/0199248 A1* | 8/2007 | Rieder et al. | 49/502 |

* cited by examiner

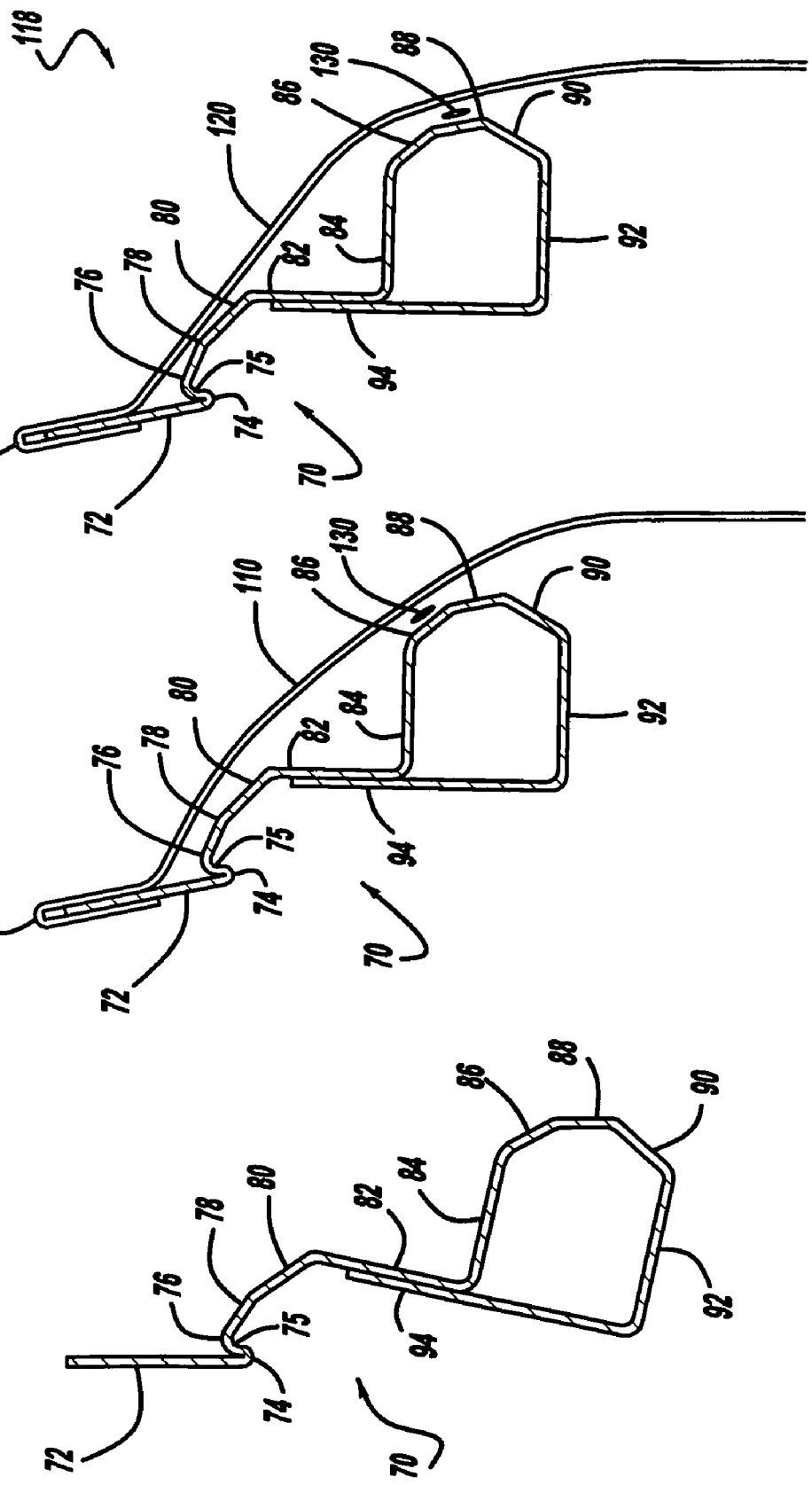

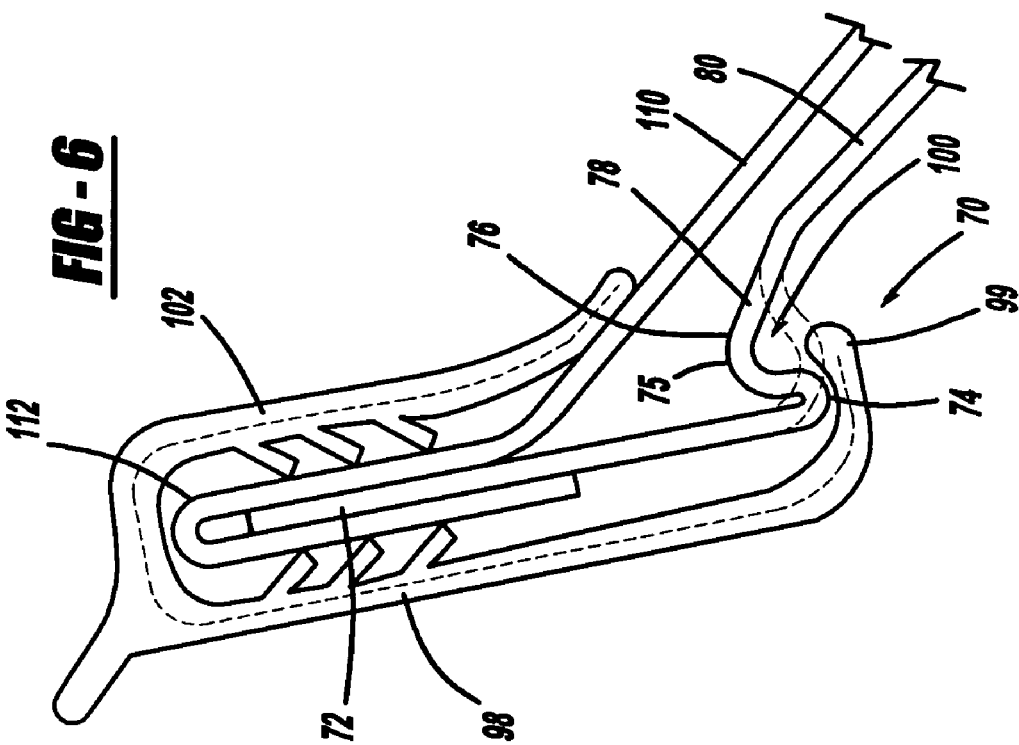
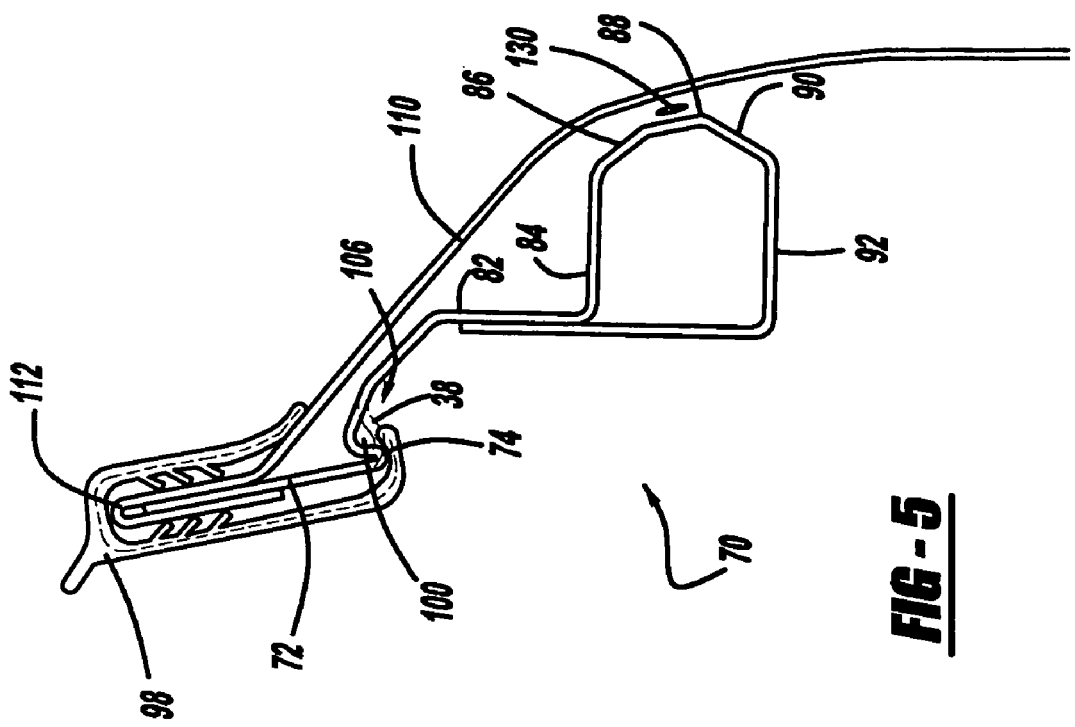

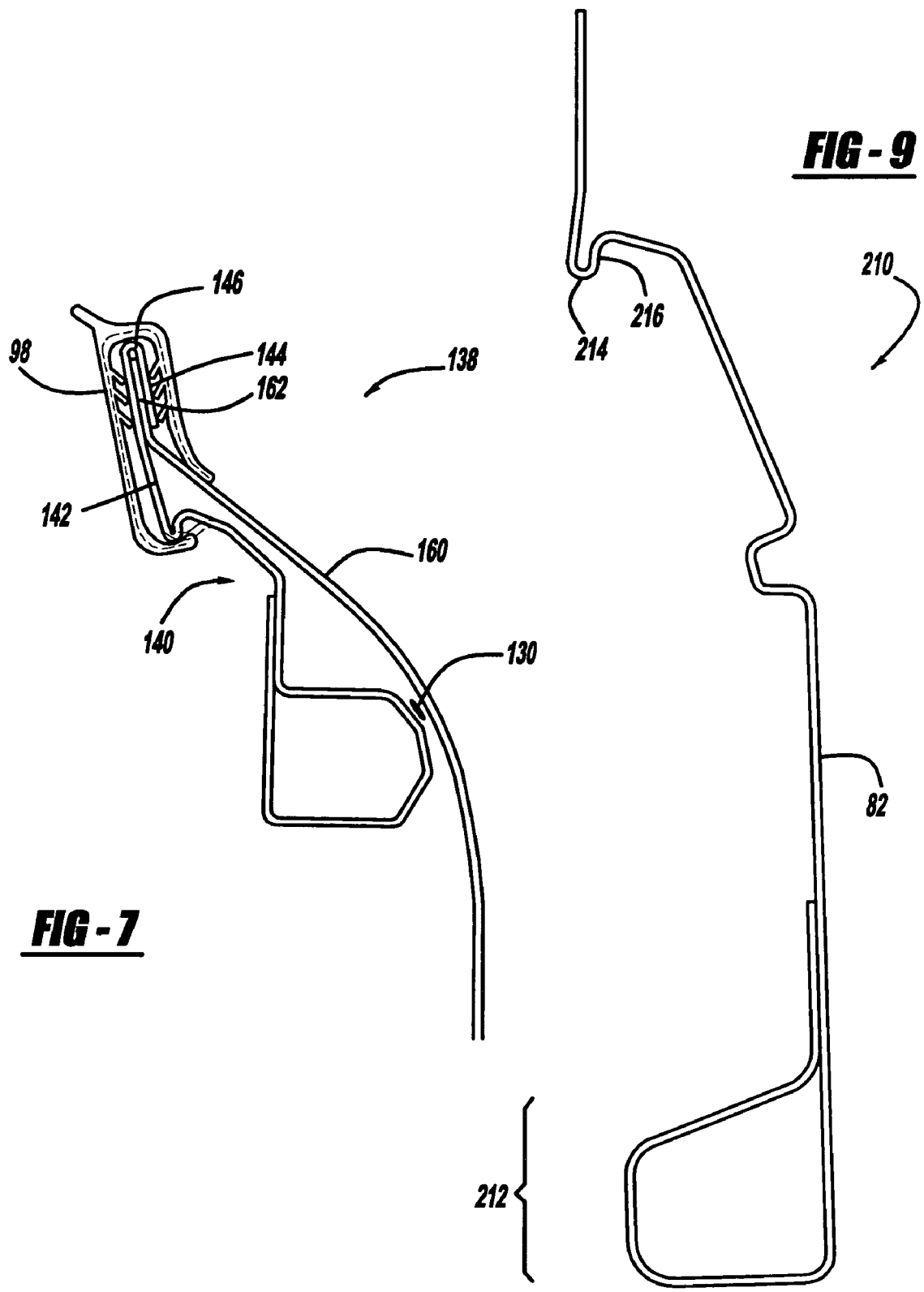

VEHICLE DOOR REINFORCEMENT

CROSS REFERENCE TO RELATED APPLICATION

This application claims priority from U.S. Provisional Patent Application Ser. No. 60/642,681 filed on Jan. 10, 2005, the content of which is incorporated herein by reference in its entirety.

BACKGROUND OF THE INVENTION

1. Field of the Invention

The invention relates to door assemblies for automotive vehicles. More particularly, the invention relates to a roll-formed door reinforcement member that provides increased strength to the door assembly.

2. Description of the Related Art

A vehicle typically includes at least one door assembly for concealing or allowing ingress/egress through openings to a passenger compartment in the vehicle. The door assembly usually includes an inner door frame structure and an outer door panel. A belt reinforcement member is provided to enhance the structural rigidity of the entire door assembly and in particular provides structural reinforcement against side impact to the outer panel door. Traditionally, the belt-reinforcement member have been formed integrally with the door panel or separately formed from a metal stamping or casting for attachment to the back side of the outer door panel.

It is continuously desirable to provide a reinforcement member that is lighter, stronger, cheaper and easier to manufacture relative to conventional reinforcement designs.

SUMMARY OF THE INVENTION

According to one aspect of the invention, a reinforcement member is provided for reinforcing a vehicle door having an outer panel. The reinforcement member includes an upper wall, an outer wall, a leg and a reinforcement beam. The upper wall has opposite upper and lower ends. The outer wall has opposite upper and lower ends. The leg extends between the lower end of the upper wall and the upper end of the outer wall. The reinforcement beam is formed at the lower end of the outer wall for reinforcing the outer panel of the vehicle door.

According to another aspect of the invention, the reinforcement member includes a generally S-shaped flange formed between the lower end of the upper wall and the leg, wherein a portion of the S-shaped flange is substantially parallel with the upper wall so as to define a recess adjacent the S-shaped flange that provides enhanced retention of a door seal thereto.

According to another aspect of the invention, a door frame assembly includes a glass supporting channel and a belt reinforcement member. The glass supporting channel has substantially upright front and rear members, and a cross member extending between upper ends of the front and rear members. The belt reinforcement member extends between the front and rear cross members of the glass supporting channel. The belt reinforcement member has an outer wall and a closed-cross section beam formed at a lower end of the outer wall.

BRIEF DESCRIPTION OF THE DRAWINGS

Advantages of the present invention will be readily appreciated as the same becomes better understood by reference to the following detailed description when considered in connection with the accompanying drawings, wherein:

FIG. 2 is a cross sectional view of the belt reinforcement member;

FIG. 3 is a cross sectional view of the belt reinforcement member shown with an outer door panel;

FIG. 4 is a cross sectional view of the belt reinforcement member shown with an outer door panel having a different cross section that that of FIG. 3;

FIG. 5 is a cross sectional view of the belt reinforcement member and outer door panel shown with a door seal;

FIG. 6 is an enlarged cross sectional view of a portion of the belt reinforcement member, outer door panel and seal of FIG. 5;

FIG. 7 is a cross sectional view of a second embodiment of belt reinforcement member;

FIG. 9 is a cross sectional view of a fourth embodiment of the belt reinforcement member.

DETAILED DESCRIPTION OF THE INVENTION

The invention provides a belt-reinforcement member for a vehicle door frame assembly, which includes a flange and a beam. As described in greater detail below, the flange is roll-formed to have a tighter curved cross-section to provide enhanced retention of a seal thereto. Further, the beam is roll-formed to define a generally closed cross section to provide higher bending strength over conventional door reinforcement designs.

Figure 1:
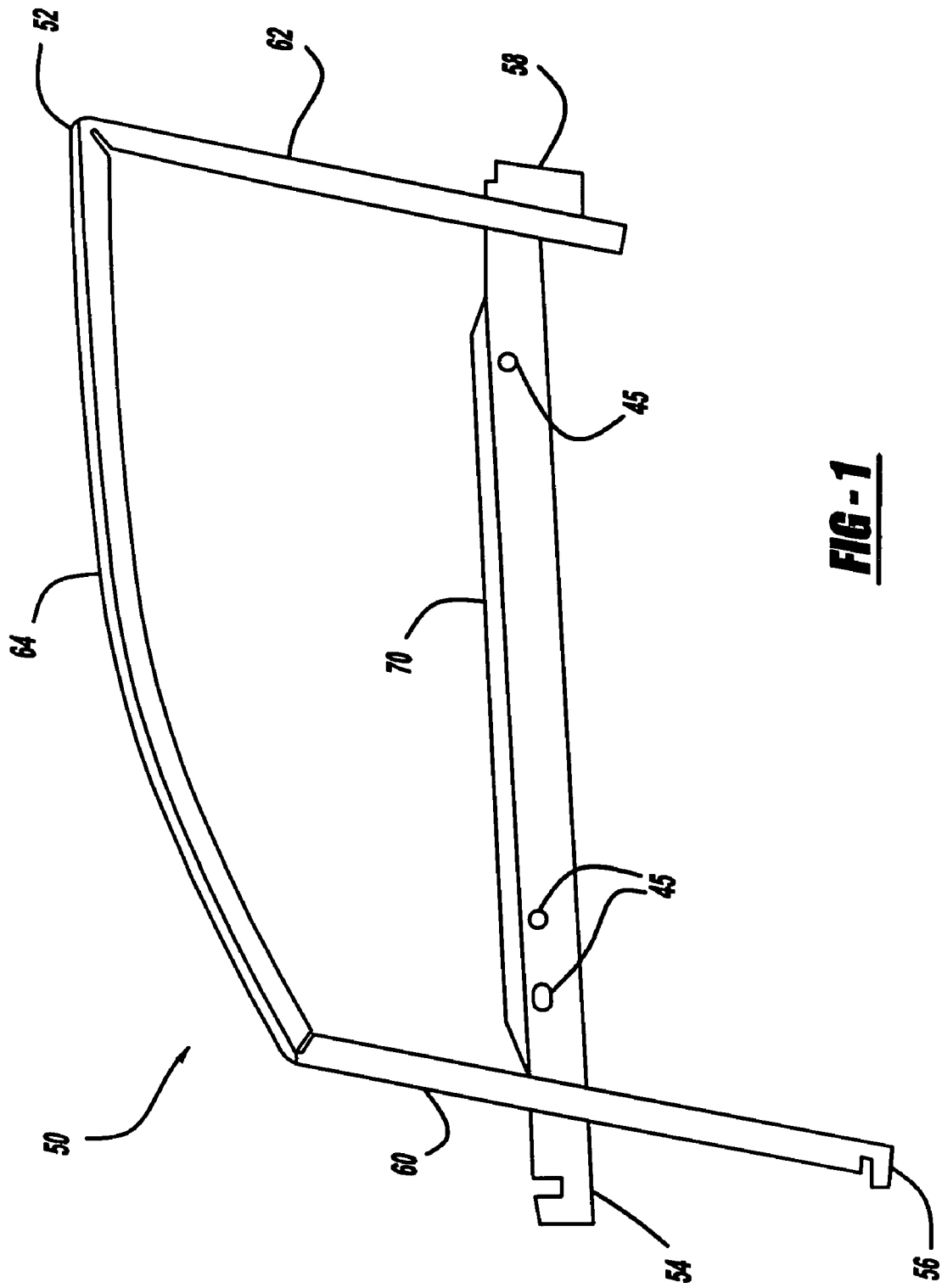
FIG. 1 is a side perspective view of a door assembly with a belt reinforcement member according to one embodiment of the invention.

Referring to FIG. 1, the vehicle door frame assembly according to an embodiment of the invention is generally indicated at 10. The frame assembly 50 includes a one-piece glass-channel run 52, an upper front bracket 54, a lower front bracket 56, a rear bracket 58, and a belt-reinforcement member generally indicated at 70. The glass-channel run 52 has substantially upright front 60 and rear 62 members and a substantially horizontal cross member 64 extending therebetween. For additional rigidity, the reinforcement member 70 is fixedly secured to a middle portion of the front member 60 and a lower end of the rear member 62. The front 54 and rear 58 brackets are fixedly secured to respective opposite ends of the belt-reinforcement member 70 outside of the glass-channel attachment areas. Optionally, the front 54 and rear 58 brackets are integrally formed with the reinforcement member 70 as a unit. The lower front bracket 56 is fixedly secured to a lower end of the front member 60. The brackets 54, 56, and 58 allow attachment of the frame assembly 50 to the vehicle.

As best shown in FIG. 2-4, the reinforcement member 70 includes an upper wall 72. A leg extends at an obtuse angle from a lower end of the reinforcement member 70. More specifically, the leg includes a pair of diagonal walls 78, 80 extending end to end from the lower end of the reinforcement member 70. The diagonal walls 78, 80 intersect at an obtuse angle relative to each other. An S-shaped flange 75 having first 74 and second 76 ends is formed between the lower end of the reinforcement member 70 and one of the diagonal walls 78 of the leg. An outer wall 82 extends downwardly from the other of the diagonal walls 80 of the leg.

A beam is formed at a lower end of the outer wall 82. The beam includes a plurality of walls 84, 86, 88, 90, 92, 94 arranged end to end to define a generally closed cross section, wherein the cross section is defined along a plane orthogonal to the length of the beam. One of the walls, now referred to as a top wall 84, extends generally orthogonally from the lower end of the outer wall 82 and toward an outer door panel 110. Another of the plurality of walls, now referred to as the inner wall 94, is substantially parallel with the outer wall 82 and fixedly secured thereto by welding or other suitable methods. The remaining plurality of walls extends end-to-end between the top wall 84 and the inner wall 94. The formation of the beam with a closed cross section provides for enhanced reinforcement of the outer panel door 110 against lateral loads applied thereon.

As illustrated in FIGS. 3 and 4, the reinforcement member 70 can be used with outer door panels 110 of various cross sectional shapes. Where necessary, filler material 130 is placed between the beam of the reinforcement member 70 and the outer door panel 110 to fill the space therebetween.

An outer door flange 112 is formed at an upper end of the outer door panel 110. The flange 112 has a substantially inverted U-shape for surrounding an end of the upper wall 72. The outer door flange 112 is fixedly secured to upper wall 72.

Referring to FIGS. 5 and 6, a conventional seal 98 having an integrally molded and plastically deformable wire reinforcement 102 is fixedly attached to the outer door panel 110 by crimping to the outer door flange 112. As shown by phantom lines, the lower end 38 of a conventional flange is formed with a gradual curve resulting in a shallow recess 106 adjacent thereto. Both the conventional lower flange 38 and the recess 106 extend longitudinally along the belt reinforcement member 24. Due to the shallow depth of the recess 106, however, the conventional belt-reinforcement member 24 provides poor retention of the seal 98 thereto.

Figure 8:
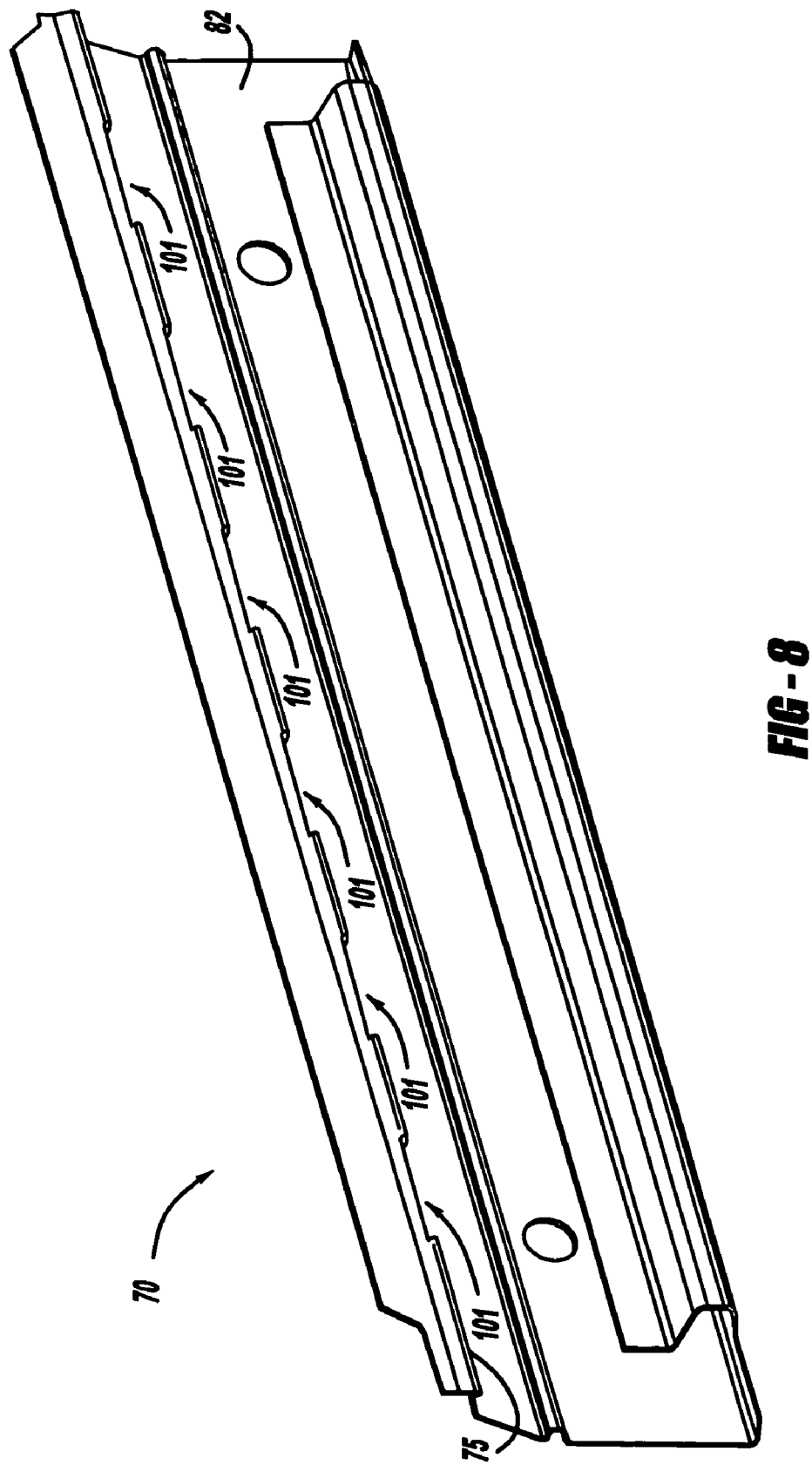
FIG. 8 is a cross sectional view of a third embodiment of the belt reinforcement member.

Thus, in one embodiment of the present invention shown by solid lines in FIGS. 5 and 6, the first end 74 of the flange 75 is formed along a tighter curve relative to the conventional lower flange 38, such that a portion of the flange 75 is parallel with the upper wall 72. The tight curvature of the first end 74 of the flange 75 results in a deeper recess 100 over conventional designs. A bulb shaped end 99 of the seal 98 is seated in the recess 100 to provide enhanced retention of the seal 98 to the reinforcement member 70. Optionally, spaced apart cutouts or notches 101 are formed along the flange 75, as shown in FIG. 8, to provide still greater retention of the seal 26 thereto. Since the belt-reinforcement member 70 is roll-formed, the deeper recess 100, as shown in FIGS. 13 and 14, can be incorporated for the full length of the first end 74 of the flange 75. The deeper recess 100 receives the lower end of the seal 98, thereby improving seal retention along the length of the belt-reinforcement member 70.

Advantages of the inventive belt-reinforcement member 70 are now discussed. In one embodiment, the belt-reinforcement member 70 of the invention has a substantially common cross-section along its length. The belt-reinforcement member 70 may also be formed with variable length and variable sweep to support numerous vehicle designs from one tool. Further, the roll-formed outer belt reinforcement 70 of the present invention is lighter and less expensive than the conventional stamped member 24. And, the closed section 96 of the belt-reinforcement member 70 is roll-formed and offers enhanced impact resistance for additional protection of the vehicles occupants over the traditional open-faced stamped belt reinforcements 24. In addition, the different end-brackets will be utilized for fit to various door sheet metal designs while utilizing a roll-formed center closed section 96 to improve performance and reduce investment cost. Therefore, the versatility of the roll forming process allows the ability of the belt-reinforcement member to have various plan view sweeps, which are required by vehicle design with no additional tool investment costs while using the same cross section.

A stamped reinforcement can be designed to accommodate only one vehicle architecture, whereas the roll-formed solution can be adapted to fit on multiple vehicles by adjusting the length of the roll formed beam with one set of tools. With roll-forming, common hole patterns 45 can be placed into the belt-reinforcement member from the end of the part to further reduce tooling investment by eliminating the need for multiple pre-notch dies or the need for adjustability to be built into the cutoff of pre-notch die. In manufacturing one embodiment of the present invention, pre-piercing the sheet metal prior to the roll-forming process, allows for such variations in length. In comparison, stamping will require new tooling for each new variation to the belt-reinforcement member and as a result, at greater costs. Additionally, roll forming can utilize a wide range of materials from mild to ultra-high strength steels while stamping is limited to conventional mild to mid-strength steels and open section designs. As a result, the inner or outer faces of the roll-formed belt-reinforcement member can be designed to support multiple inner or outer door sheet metal designs. This greatly reduces manufacturing costs and allows for interchangeability between multiple designs without major retooling and loss of additional manufacturing time.

Referring to FIG. 7, a second embodiment of the belt-reinforcement member is generally indicated at 140. The reinforcement member 140 has a U-shaped outer flange 146 that extends about an upper end 162 of the outer door panel 160. The outer flange 146 is crimped over an upper edge 162 of the outer door panel 160. Optionally, the outer flange 146 is welded to the upper edge 162.

Referring to FIG. 9, a third embodiment of the belt reinforcement member is shown at 210, wherein the closed cross section beam 212 is disposed inwardly with respect to the outer wall 82, rather than outwardly as provided in the previous embodiments. The belt reinforcement member 210 still includes the S-shaped flange 214 with the tight curvature of the first end 216 to provide enhanced retention of the seal (not shown) thereto.

Figure 10:
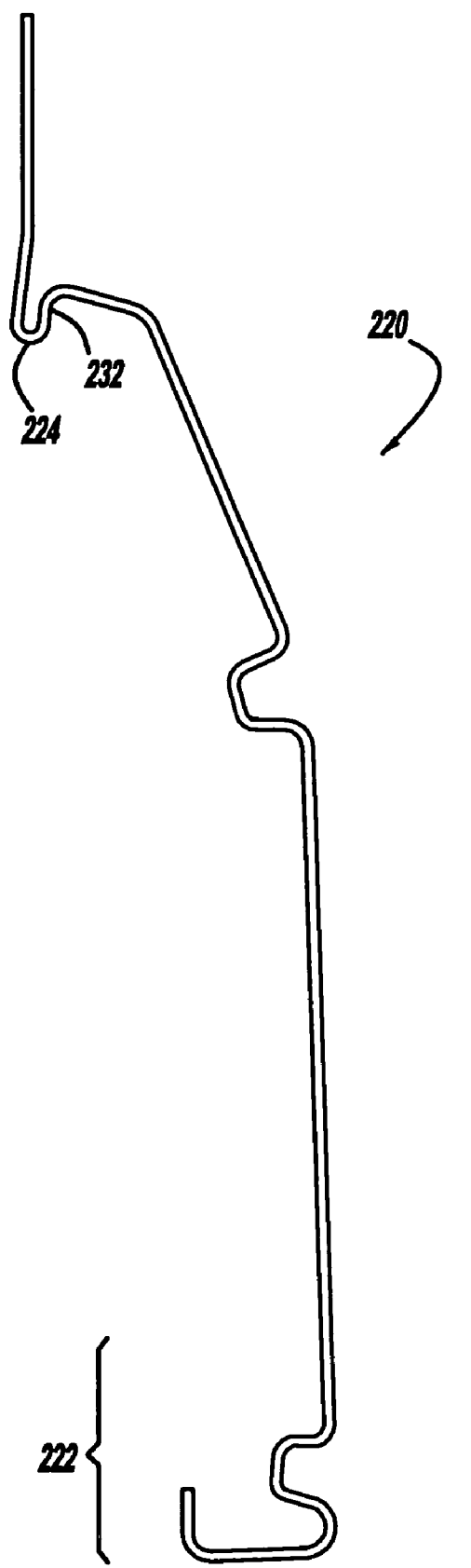
FIG. 10 is a cross sectional view of another embodiment of the belt reinforcement member.

Referring to FIG. 10, a fourth embodiment of the belt reinforcement member is shown at 220, wherein the beam portion 222 has an open cross section instead of the closed section of the prior embodiments. The belt reinforcement member 220 of this embodiment also includes the S-shaped flange 224 with the tight curvature of the first end 226 to provide enhanced retention of the seal (not shown) thereto.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

We claim:

1. A reinforcement member for reinforcing a vehicle door having an outer panel, said reinforcement member comprising:

an upper wall having opposite upper and lower ends;
an outer wall having opposite upper and lower ends;
a leg extending between said lower end of said upper wall and said upper end of said outer wall;
an S-shaped flange formed between said lower end of said upper wall and said leg, a portion of said S-shaped flange being substantially parallel with said upper wall; and a reinforcement beam formed at said lower end of said outer wall for reinforcing the outer panel of the vehicle door.

2. A reinforcement member as set forth in claim 1, wherein said leg includes a pair of walls extending end to end between said S-shaped flange and said upper end of said outer wall, said diagonal walls intersecting at an obtuse angle relative to each other.

3. A reinforcement member as set forth in claim 1 formed from high strength sheet steel.

4. A reinforcement member as set forth in claim 1 formed by the process of roll forming.

5. A reinforcement member as set forth in claim 1, wherein said beam has a closed cross section.

6. A reinforcement member as set forth in claim 5, wherein said cross section of said beam is defined by:
   an inner wall fixedly secured to said outer wall;
   generally parallel and spaced apart top and bottom walls extending generally orthogonally from said inner wall; and
   a segmented wall extending between said top and bottom walls to define said closed cross section, said segmented wall having a plurality of segments being arranged end to end at obtuse angles relative to each other.

7. A reinforcement member as set forth in claim 5, wherein said cross section of said beam is substantially rectangular.

8. A reinforcement member for reinforcing a vehicle door, wherein the vehicle door includes an outer panel, said reinforcement member comprising:
   an upper wall having opposite upper and lower ends;
   an outer wall having opposite upper and lower ends;
   a leg extending between said lower end of said upper wall and said upper end of said outer wall; and
   a generally S-shaped flange formed between said lower end of said upper wall and said leg, wherein a portion of said S-shaped flange is substantially parallel with said upper wall so as to define a recess adjacent said S-shaped flange that provides enhanced retention of a door seal thereto.

9. A reinforcement member as set forth in claim 8, including a beam formed at said lower end of said outer wall.

10. A reinforcement member as set forth in claim 9 wherein said beam has a closed cross section.

11. A reinforcement member as set forth in claim 10, wherein said cross section of said beam is substantially rectangular.

12. A reinforcement member as set forth in claim 11, wherein said cross section of said beam is defined by an inner wall, top and bottom walls extending orthogonally from said inner wall, and a plurality of walls extending end to end at obtuse angles relative to each other between said top and bottom walls.

13. A reinforcement member as set forth in claim 12 roll-formed from a high strength sheet steel.

14. A door frame assembly comprising:
   a glass supporting channel having substantially upright front and rear members, said supporting channel having a cross member extending between upper ends of said front and rear members; and
   a belt reinforcement member extending between said front and rear members of said glass supporting channel, said belt reinforcement member comprising:
      an upper wall;
      an outer wall spaced apart from said upper wall
      a leg extending between a lower end of said upper wall and an upper end of said outer wall; and
      a generally S-shaped flange formed between said lower end of said upper wall and said leg, where a portion of said S-shaped flange is substantially parallel with said upper wall so as to define a recess adjacent said S-shaped flange that provides enhanced retention of a door seal thereto.

15. A reinforcement member as set forth in claim 14 including a beam formed at a lower end of said outer wall.

16. A reinforcement member as set forth in claim 15 wherein said beam has a closed cross section.

17. A reinforcement member as set forth in claim 16, wherein said cross section of said beam is substantially rectangular.

18. A reinforcement member as set forth in claim 16, wherein said cross section of said beam is defined by an inner wall, top and bottom walls extending orthogonally from said inner wall, and a plurality of walls extending end to end at obtuse angles relative to each other between said top and bottom walls.

19. A door frame assembly comprising:
   a glass supporting channel having substantially upright front and rear members, said supporting channel having a cross member extending between upper ends of said front and rear members; and
   a belt reinforcement member extending between said front and rear cross members of said glass supporting channel, said belt reinforcement member having an outer wall, an upper wall spaced apart from said outer wall, a leg extending transversely between a lower end of said upper wall and an upper end of said outer wall, a generally S-shaped flange formed between said lower end of said upper wall and said leg and a closed-cross section beam formed at a lower end of said outer wall;
   wherein a portion of said S-shaped flange is substantially parallel with said upper wall so as to define a recess adjacent to said S-shaped flange, which provides enhanced retention of a door seal thereto.

* * * * *